(12) United States Patent
Wakazono

(10) Patent No.: US 10,331,014 B2
(45) Date of Patent: Jun. 25, 2019

(54) IMAGE PROCESSING APPARATUS, IMAGE PROCESSING METHOD, DISPLAY CONTROL APPARATUS, AND DISPLAY CONTROL METHOD

(71) Applicant: SONY CORPORATION, Tokyo (JP)

(72) Inventor: Masafumi Wakazono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/580,328

(22) PCT Filed: Apr. 14, 2016

(86) PCT No.: PCT/JP2016/002010
§ 371 (c)(1),
(2) Date: Dec. 7, 2017

(87) PCT Pub. No.: WO2016/203685
PCT Pub. Date: Dec. 22, 2016

(65) Prior Publication Data
US 2018/0224714 A1  Aug. 9, 2018

(30) Foreign Application Priority Data

Jun. 18, 2015 (JP) ................. 2015-122839

(51) Int. Cl.
*H04N 5/232* (2006.01)
*G03B 13/16* (2006.01)
*G03B 13/36* (2006.01)
*G03B 17/18* (2006.01)
(Continued)

(52) U.S. Cl.
CPC ............. *G03B 13/16* (2013.01); *G03B 13/36* (2013.01); *G03B 17/18* (2013.01); *G06T 1/20* (2013.01); *H04N 5/23212* (2013.01); *H04N 5/23216* (2013.01); *H04N 5/23293* (2013.01); *G02B 7/365* (2013.01)

(58) Field of Classification Search
USPC .................................................. 348/333.02
See application file for complete search history.

(56) References Cited

U.S. PATENT DOCUMENTS 5,754,276 A * 5/1998 Fujibayashi ......... G03B 21/118
355/45
2006/0033831 A1 2/2006 Ejima et al.
(Continued)

FOREIGN PATENT DOCUMENTS

JP 2001-086385 A 3/2001
JP 2006-345304 A 12/2006
(Continued)

OTHER PUBLICATIONS

International Search Report and Written Opinion of PCT Application No. PCT/JP2016/002010, dated Jun. 28, 2016, 15 pages of ISRWO.

*Primary Examiner* — Joel W Fosselman
(74) *Attorney, Agent, or Firm* — Chip Law Group

(57) ABSTRACT

An image processing apparatus including: a display control unit configured to display highlighting corresponding to an in-focus degree of a subject included in an image on the basis of predetermined sensitivity and to perform control so that the sensitivity is determined depending on a predetermined condition.

10 Claims, 9 Drawing Sheets

(51) Int. Cl.
  *G06T 1/20*  (2006.01)
  *G02B 7/36*  (2006.01)

(56) References Cited

U.S. PATENT DOCUMENTS

| | | | |
|---|---|---|---|
| 2010/0149350 A1* | 6/2010 | Fukumoto | H04N 5/23232 |
| | | | 348/208.4 |
| 2012/0051729 A1* | 3/2012 | Maeda | G03B 7/20 |
| | | | 396/63 |
| 2015/0103223 A1* | 4/2015 | Park | H04N 5/23212 |
| | | | 348/333.12 |

FOREIGN PATENT DOCUMENTS

| | | |
|---|---|---|
| JP | 2007-028380 A | 2/2007 |
| JP | 2016-057349 A | 4/2016 |

\* cited by examiner

| SHOOTING CONDITION | | SENSITIVITY a |
|---|---|---|
| VIBRATION OF IMAGE CAPTURING APPARATUS | LARGE | SMALL |
| | SMALL | LARGE |
| SHOOTING MODE | LANDSCAPE MODE | LARGE |
| | NIGHTSCAPE MODE | LARGE |
| | SPORTS MODE | SMALL |

IMAGE PROCESSING APPARATUS, IMAGE PROCESSING METHOD, DISPLAY CONTROL APPARATUS, AND DISPLAY CONTROL METHOD

CROSS REFERENCE TO RELATED APPLICATIONS

This application is a U.S. National Phase of International Patent Application No. PCT/JP2016/002010 filed on Apr. 14, 2016, which claims priority benefit of Japanese Patent Application No. JP 2015-122839 filed in the Japan Patent Office on Jun. 18, 2015. Each of the above-referenced applications is hereby incorporated herein by reference in its entirety.

TECHNICAL FIELD

The present technology relates to an image processing apparatus, an image processing method, a display control apparatus, and a display control method.

BACKGROUND ART

In the manual focusing of a digital camera, a photographer searches for a focus position (in-focus position) where a subject becomes sharpest on a monitoring image by adjusting the focus position of a lens, thereby performing a focusing operation. An assist function called peaking is proposed to improve the accuracy of this focusing (see, for example, Patent Literature 1). The peaking function is a function of determining that a portion where the energy of a high frequency component exceeds a threshold in an input image is in focus and of performing highlighting by rendering a marker and the like on a pixel determined to be in focus. The photographer adjusts a focusing position so that most of the markers are rendered on a subject that is intended to be in-focus, thereby achieving the in-focus state.

CITATION LIST

Patent Literature

Patent Literature 1: JP 5277873B

DISCLOSURE OF INVENTION

Technical Problem

However, the magnitude of the energy of a high frequency component in the monitoring image is affected not only by the degree of focusing but also by frequency characteristics of a subject itself. In one example, in a subject having high contrast and texture with edge, the high frequency energy tends to be high. Conversely, in a subject having low contrast and smooth texture, the high frequency energy tends to be low. In the former case, displayed peaking markers will be saturated before achieving focusing, and then this will remain the quantity of markers before and behind the in-focus position. In the latter case, there is no marker displayed even if focusing is achieved. In either case, the marker is not displayed properly, so there is a problem that the peaking function fails to assist the focus operation.

The present technology is made in view of such problems, and is intended to provide an image processing apparatus, image processing method, display control apparatus, and display control method, capable of performing appropriate peaking.

Solution to Problem

To solve the above-described problems, the present technology is, for example, an image processing apparatus including: a display control unit configured to display highlighting corresponding to an in-focus degree of a subject included in an image on the basis of predetermined sensitivity and to perform control so that the sensitivity is determined depending on a predetermined condition.

The present technology is, for example, an image processing method including: displaying highlighting corresponding to an in-focus degree of a subject included in an image on the basis of predetermined sensitivity and performing control so that the sensitivity is determined depending on a predetermined condition.

The present technology is, for example, a display control apparatus including: a display control unit configured to cause a display unit to display highlighting corresponding to an in-focus degree of a subject included in an image so that the highlighting is differently displayed between a case where the in-focus degree is increased and a case where the in-focus degree is decreased.

The present technology is, for example, a display control method including: causing a display unit to display highlighting corresponding to an in-focus degree of a subject included in an image so that the highlighting is differently displayed between a case where the in-focus degree is increased and a case where the in-focus degree is decreased.

Advantageous Effects of Invention

According to at least one embodiment of the present technology, it is possible to perform appropriate peaking. Note that the effects described herein are not necessarily limited, and any of the effects described in the present technology may be used. In addition, the contents of the present technology are not to be construed as limited by the exemplified effect.

MODE(S) FOR CARRYING OUT THE INVENTION

Embodiments or variations of the present technology will be described below with reference to the drawings. Note that the description is given in the following order.
<1. Embodiment>
<2. Modified Example>

The embodiments or variations described below are preferable specific examples of the present technology, and the scope of the present technology is not to be construed as limited to these embodiments or the like.

1. Embodiment

"Configuration Example of Image Processing Apparatus"

Figure 1:
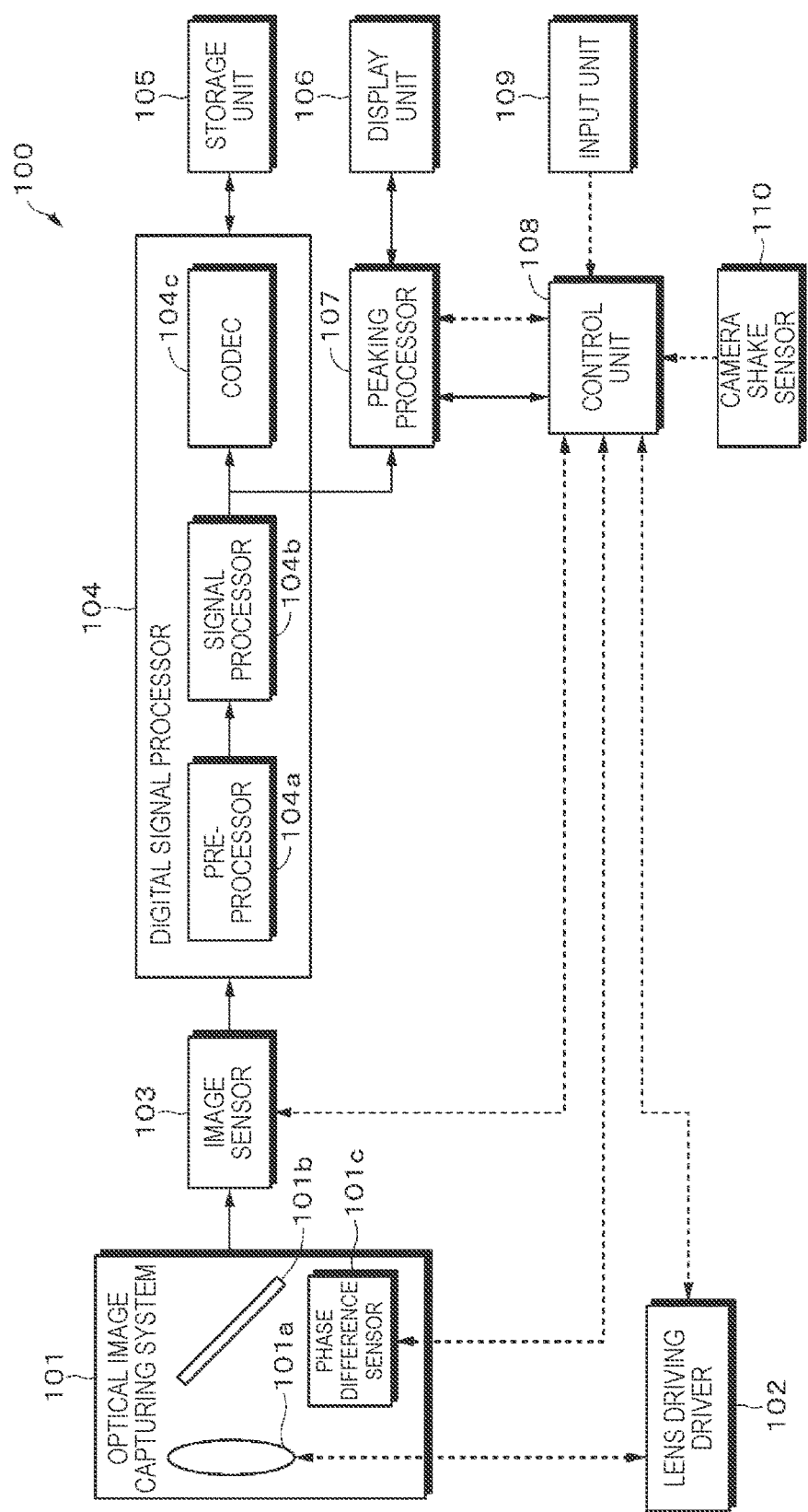
FIG. 1 is a block diagram illustrating a configuration example of an image capturing apparatus.

FIG. 1 is a block diagram illustrating a configuration of an image capturing apparatus using an image processing apparatus according to an embodiment. In FIG. 1, the solid line arrow represents a flow of image data, and the broken line arrow represents a flow of a control signal or data.

The image capturing apparatus 100 includes, in one example, an optical image capturing system 101, a lens driving driver 102, an image sensor 103, a digital signal processor 104, a storage unit 105, a display unit 106, a peaking processor 107, a control unit 108, an input unit 109, and a camera shake sensor 110.

The optical image capturing system 101 includes a lens 101a, a half mirror 101b, and a phase difference sensor 101c. The lens 101a is used to condense light from a subject on the image sensor. The half mirror 101b is used to guide light incident through the lens to the image sensor and the phase difference sensor. The phase difference sensor 101c is a sensor for auto focus (AF) based on phase difference detection. Furthermore, the optical image capturing system 101 includes, in one example, a driving mechanism, which is used to move a photographic lens to perform focusing or zooming, a shutter mechanism, an iris mechanism and the like (illustration of these components is omitted). The lens 101a is a lens for condensing light from a subject on the image sensor 103. The optical image of a subject, which is obtained through the lens 101a, is guided toward the direction of the image sensor by the half mirror 101b and is formed on the image sensor 103.

The lens driving driver 102 includes, in one example, a microcomputer or the like, and controls operations of the driving mechanism, the shutter mechanism, the iris mechanism, or the like of the optical image capturing system 101 under the control of the control unit 108. This allows exposure time (shutter speed), aperture value (F-number), or the like to be adjusted.

The image sensor 103 photoelectrically converts incident light from a subject into electric charge and outputs it as an analog image capturing signal. The analog image capturing signal is output from the image sensor 103 to the digital signal processor 104. An example of the image sensor 103 includes charge-coupled device (CCD), complementary-metal-oxide semiconductor (CMOS), or the like. Note that the configuration in which a pixel functioning as a phase difference sensor is arranged in a part of the image sensor 103 (so-called image plane phase difference technique) may be used.

The digital signal processor 104 includes, in one example, a pre-processor 104a, a signal processor 104b, and a codec 104c. The pre-processor 104a performs sample-and-hold processing or the like on the image capturing signal that is output from the image sensor 103 so that a satisfactory signal-to-noise (S/N) ratio may be maintained by correlated double sampling (CDS) processing. Furthermore, gain is controlled by auto gain control (AGC) processing, and analog-to-digital (A/D) conversion is performed to output a digital image signal.

The signal processor 104b performs predetermined signal processing such as correlated double sampling (CDS) processing, auto gain control (AGC) processing, demosaic processing, white balance adjustment processing, color correction processing, gamma correction processing, Y/C conversion processing, auto exposure (AE) processing, and resolution conversion processing, on the image signal.

The codec 104c performs, in one example, coding processing for recording or communication on the image signal that is subjected to the predetermined processing such as resolution conversion.

The storage unit 105 is, in one example, a high capacity storage medium (including a driver for performing storage/reproduction processing thereon) such as a hard disk or a flash memory. The image is stored, in one example, in a compressed state using the standard such as Joint Photographic Experts Group (JPEG). In addition, exchangeable image file format (Exif) data including information on a stored image and additional information such as shooting date and time is also stored in association with the image. The moving image is saved in a format such as Moving Picture Experts Group2 (MPEG2), MPEG 4, or the like. Note that the storage unit 105 may be built in the image capturing apparatus 100 or may be detachably attached thereto. In addition, the storage unit 105 may include a plurality of storage apparatuses (e.g., a memory built in the image capturing apparatus 100 and a memory detachably attached to the image capturing apparatus 100).

The display unit 106 is a display device including, in one example, a liquid crystal display (LCD), a plasma display panel (PDP), an organic electro luminescence (EL) panel, or the like. On the display unit 106, a user interface of the image capturing apparatus 100, a menu screen, a through-the-lens image being captured, a captured image recorded in the storage unit 105, a captured image, an image transmitted via wire or wireless from an external apparatus, an image subjected to peaking processing, or the like is displayed. Note that the image may be a moving image or a still image.

The peaking processor 107 displays highlighting depending on the in-focus degree of a subject included in the image on the basis of predetermined sensitivity. Here, the in-focus degree refers to, in one example, the degree of in-focus (focus). The increase in the in-focus degree refers that the degree of in-focus (focus) is increased, and the decrease in the in-focus degree refers that the degree of in-focus (focus) is decreased. In one example, the peaking processor 107 performs peaking processing for highlighting a pixel having high energy (with high edge) of a high frequency component in an image. Note that the pixel to be subjected to the peaking processing is referred to as a specific pixel as appropriate in the following description.

The control unit 108 includes a central processing unit (CPU), a random-access memory (RAM), a read-only memory (ROM), or the like. The ROM stores a program or the like that is read and operated by the CPU. The RAM is used as a work memory of the CPU. The CPU executes various kinds of processing in accordance with a program stored in the ROM and issues a control command to control the entire image capturing apparatus 100. Note that the control unit 108 is configured to be capable of exchanging various data such as image data or a control signal with the peaking processor 107.

The input unit 109 includes, in one example, a power button for switching power on/off, a release button for instructing the start of recording of a captured image, an operating tool for zoom adjustment, a touch screen integrally formed with the display unit 106, or the like. The input unit 109 may be a remote control apparatus capable of operating the image capturing apparatus 100 by remote control. When the input unit 109 receives an input, a control signal corresponding to the input is generated and is output to the control unit 108. Then, the control unit 108 performs arithmetic processing and control corresponding to the control signal.

The camera shake sensor 110 detects camera shake while shooting, in one example, by an acceleration sensor or an angular velocity sensor in two axial directions, and supplies camera shake information to the control unit 108. The control unit 108 performs camera shake correction control on the basis of the camera shake information from the camera shake sensor 110.

"Functional Blocks"

Figure 2:
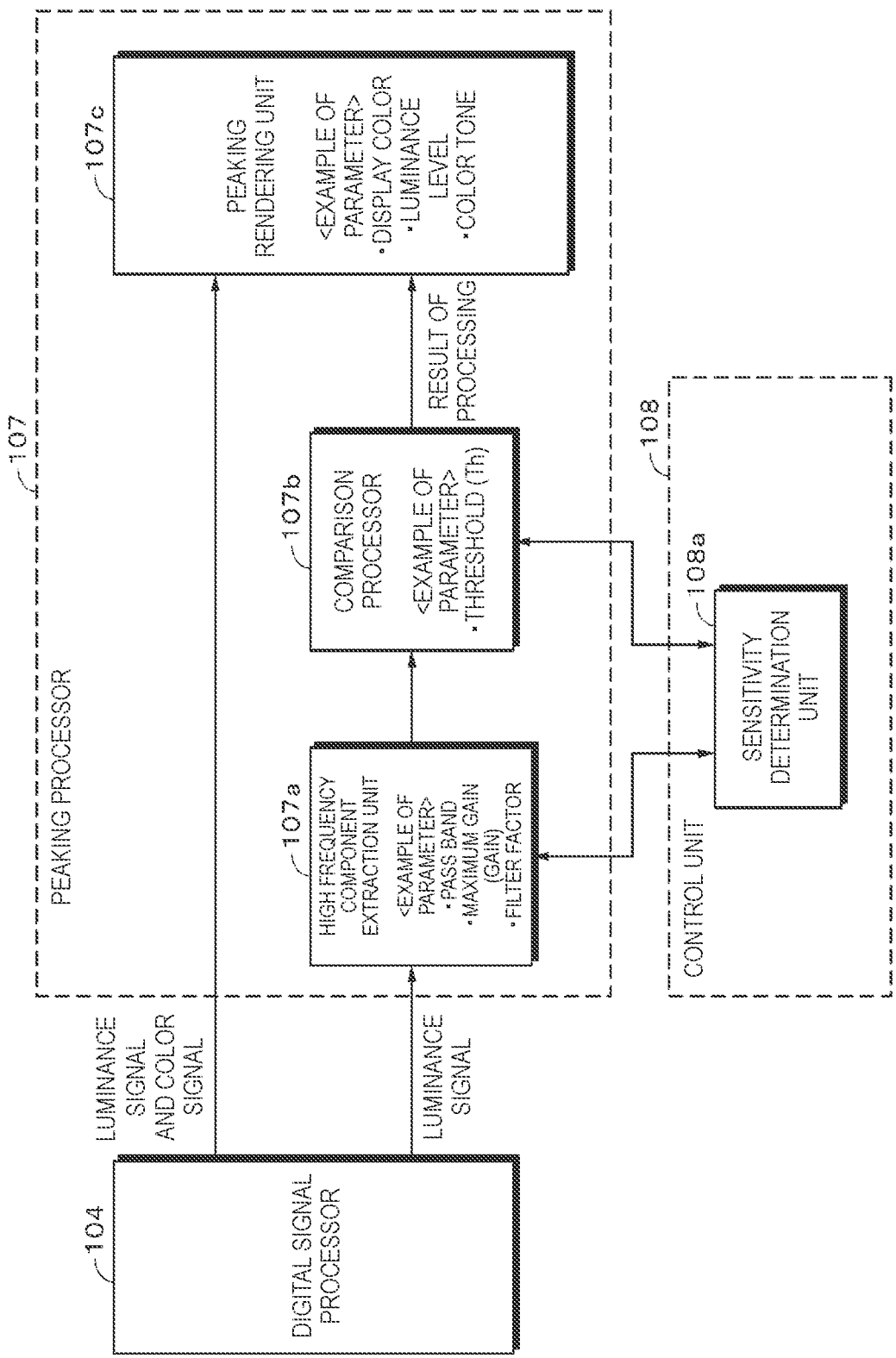
FIG. 2 is a functional block diagram illustrated to describe an example of functions of an image capturing apparatus.

Next, functional blocks of each of the peaking processor 107 and the control unit 108 are described with reference to FIG. 2. Note that a display control unit according to the embodiment is configured by functions of the peaking processor 107 and the control unit 108. The peaking processor 107 has a high frequency component extraction unit 107a, a comparison processor 107b, and a peaking rendering unit 107c as functional blocks. In addition, the control unit 108 has a sensitivity determination unit 108a as a functional block.

The peaking processor 107 receives an image signal from the digital signal processor 104 as an input. Specifically, the signal processor 104b of the digital signal processor 104 performs Y/C conversion processing to form a luminance signal converted into the color space having the luminance signal (Y) and the color difference signals (Cr and Cb). The luminance signal is input to the high frequency component extraction unit 107a, and the luminance signal and the color difference signal are input to the peaking rendering unit 107c.

The high frequency component extraction unit 107a acquires an evaluation value for each pixel by performing a filter operation using a high-pass filter on the luminance signal. This evaluation value is a value indicating how much high frequency components are contained in an image at each pixel position.

The comparison processor 107b acquires a threshold used to determine the specific pixel. Then, the comparison processor 107b compares the evaluation value for each pixel with the acquired threshold, determines that a pixel whose evaluation value is larger than the threshold as the specific pixel, and supplies position information of the specific pixel as a result of the processing to the peaking rendering unit 107c.

The peaking rendering unit 107c performs the peaking processing of highlighting the specific pixel that is a pixel corresponding to the position information. The highlighting of the specific pixel is performed, in one example, by rendering the specific pixel with a marker of a predetermined color, changing the luminance or color tone of the specific pixel, or superimposing a signal for highlighting on the specific pixel. Note that the peaking processing may be performed not for the specific pixel but for a pixel other than the specific pixel. In one example, the luminance or color tone of a pixel other than the specific pixel is lowered relatively so that pixels other than the specific pixel may be blurred and displayed. In this way, the details of the peaking processing are not limited to particular ones as long as it is possible to distinguish the specific pixel from other pixels. The image data subjected to the peaking processing by the peaking rendering unit 107c is supplied to the display unit 106 for displaying.

Each of the high frequency component extraction unit 107a, the comparison processor 107b, and the peaking rendering unit 107c has a parameter, which is set therein, used to execute each processing. An example of the parameter to be set in the high frequency component extraction unit 107a can include a pass band of a high-pass filter, the maximum gain (gain) of the high-pass filter, and a filter factor of the high-pass filter. An example of the parameter to be set in the comparison processor 107b can include a threshold used to determine the specific pixel. An example of the parameter to be set in the peaking rendering unit 107c can include a display color, a luminance level, a color tone, or the like.

The sensitivity determination unit 108a determines the sensitivity on the basis of a predetermined condition. The sensitivity determined by the sensitivity determination unit 108a defines the easiness of peaking response, and it is, in one example, a factor used to modulate the parameter by at least one of the high frequency component extraction unit 107a and the comparison processor 107b. Note that a specific example of the sensitivity determined by the sensitivity determination unit 108a will be described later. The sensitivity determined by the sensitivity determination unit 108a is supplied to, in one example, the high frequency component extraction unit 107a. The high frequency component extraction unit 107a modulates at least one parameter depending on the sensitivity. The same applies to the comparison processor 107b. Note that a component depending on the function may be appropriately added to the peaking processor 107 and the control unit 108 or may be deleted from them.

"Modulation Example of Parameter Depending on Sensitivity"

Figure 3:
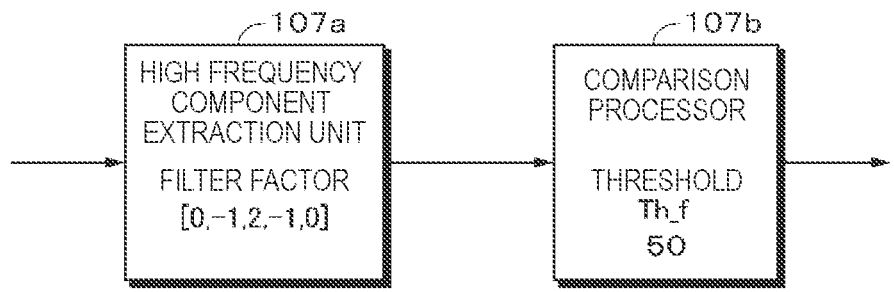
FIG. 3 is a diagram illustrated to describe an example of a filter factor of a high frequency component extraction unit and an example of a threshold of a comparison processor.

FIG. 3 illustrates an example of a parameter of each of the high frequency component extraction unit 107a and the comparison processor 107b. As the filter factors of the high-pass filter of the high frequency component extraction unit 107a, in one example, [0, −1, 2, −1, 0] are set. As the threshold used to determine the specific pixel in the comparison processor 107b (hereinafter appropriately referred to as a threshold Th_f), 50 is set. Of course, the filter factor and the threshold Th_f are values set for convenience of description, and the scope of the present technology is not limited thereto.

Figure 4:
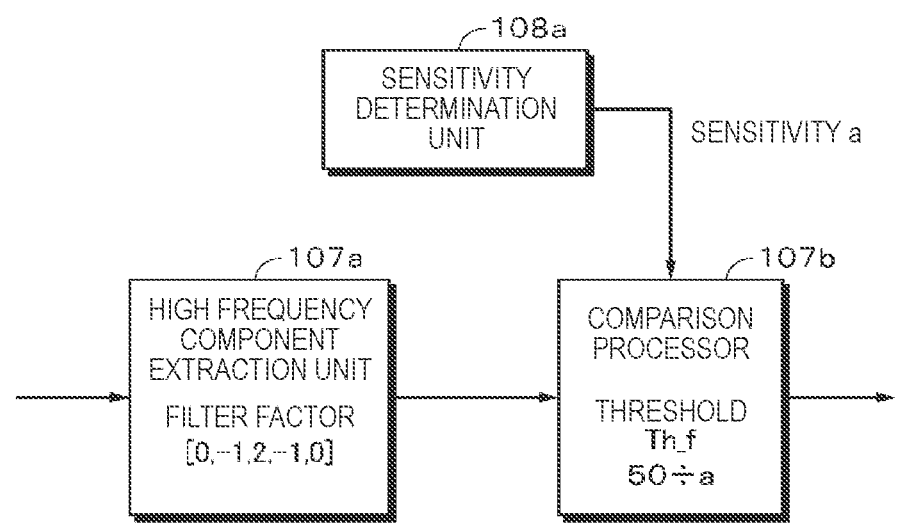
FIG. 4 is a diagram illustrated to describe an example of a parameter modulation.

Next, an example of modulating the parameter depending on sensitivity is described. FIG. 4 illustrates an example of modulating a parameter depending on sensitivity (first modulation example). The first modulation example is an example in which the threshold Th_f, which is one of the parameters of the comparison processor 107b, is modulated on the basis of the sensitivity determined by the sensitivity determination unit 108a (hereinafter appropriately referred to as sensitivity a). The sensitivity a is supplied from the sensitivity determination unit 108a to the comparison processor 107b. The comparison processor 107b modulates the threshold Th_f by dividing the threshold Th_f by the sensitivity a. In increasing the sensitivity a, in one example, in the case where the sensitivity is doubled (a=2), the threshold Th_f is decreased by half, which is equal to 25. Conversely, in decreasing the sensitivity a, in one example, in the case where the sensitivity is halved (a=½), the threshold Th_f is increased to 100, which is doubled.

The increase in the sensitivity a decreases the threshold Th_f, so increasing the sensitivity a is processing of increasing the peaking response. On the contrary, the decrease in the sensitivity a increases the threshold Th_f, so decreasing the sensitivity a is processing of decreasing the peaking response.

Figure 5:
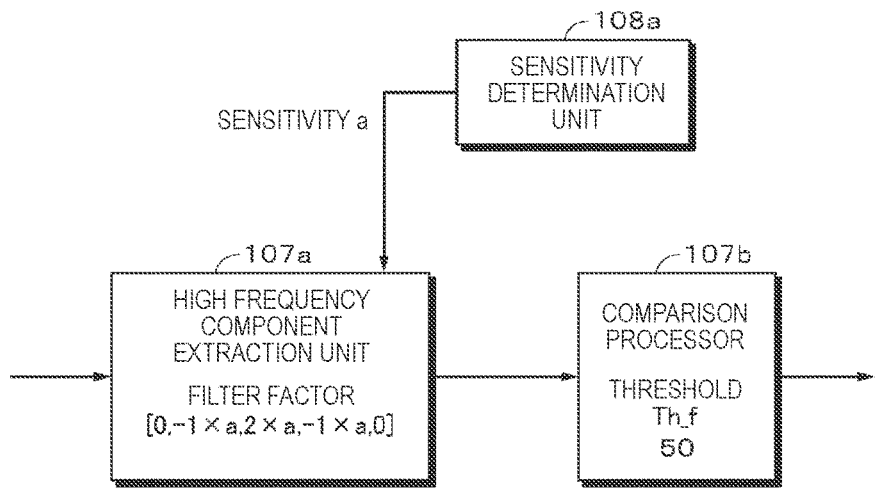
FIG. 5 is a diagram illustrated to describe an example of a parameter modulation.

FIG. 5 illustrates an example of modulating a parameter depending on the sensitivity (second modulation example). The second modulation example is an example in which the filter factor of the high frequency component extraction unit 107a is modulated on the basis of the sensitivity a determined by the sensitivity determination unit 108a. In increasing the sensitivity a, in one example, in the case where the sensitivity is doubled (a=2), each factor of the filter factors is multiplied by 2. In other words, the filter factors are changed to [0, −2, 4, −2, 0]. Conversely, in decreasing the sensitivity a, in one example, in the case where the sensitivity is halved (a=½), each factor of the filter factors is multiplied by ½. In other words, the filter factors are changed to [0, −½, 1, −½, 0].

The increase in the sensitivity a enhances the signal passing through the high-pass filter, resulting in the processing of increasing the peaking response. Conversely, the decrease in the sensitivity a is the processing of decreasing the peaking response.

Figure 6:
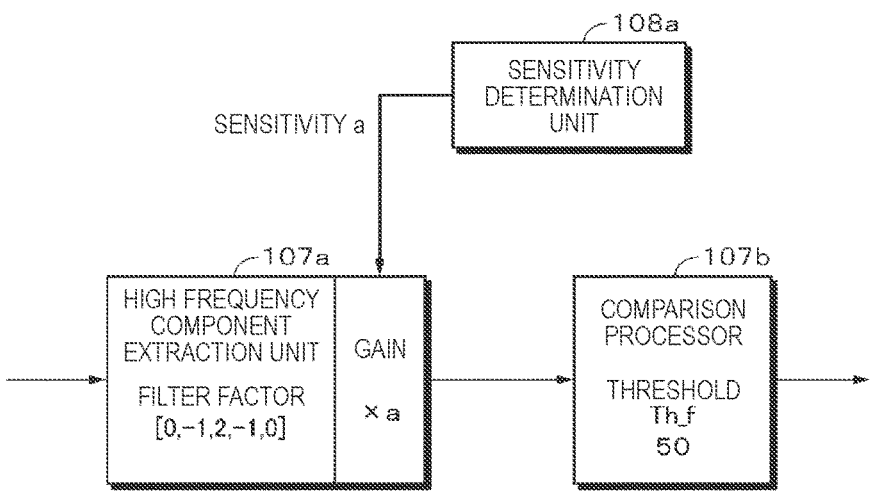
FIG. 6 is a diagram illustrated to describe an example of a parameter modulation.

FIG. 6 illustrates an example of modulating a parameter depending on the sensitivity (third modulation example). The third modulation example is an example in which the gain of a signal passing through the high frequency component extraction unit 107a is modulated on the basis of the sensitivity a determined by the sensitivity determination unit 108a. In increasing the sensitivity a, in one example, in the case where the sensitivity is doubled (a=2), processing of doubling the gain is additionally performed. On the contrary, in decreasing the sensitivity a, in one example, in the case where the sensitivity is halved (a=½), processing of setting the gain to ½ is additionally performed. As a detailed example, by doubling the sensitivity a, the maximum gain of extracting the high frequency component in the high frequency component extraction unit 107a is changed from 0 dB (decibel) to 6 dB.

Note that the modulation of the gain and the modulation of the threshold can be executed as equivalent processing. In other words, in one example, doubling the gain is equivalent in processing to halving the threshold.

The increase in the sensitivity a increases the gain, so increasing the sensitivity a is the processing of increasing the peaking response. The decrease in the sensitivity a decreases the gain, so decreasing the sensitivity a is the processing of decreasing the peaking response.

Figure 7:
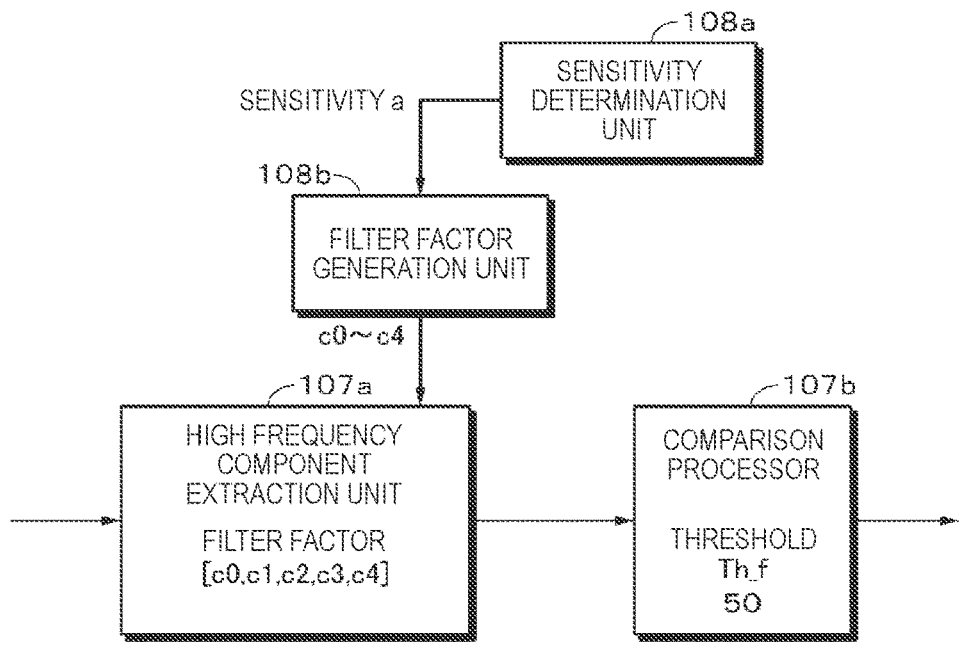
FIG. 7 is a diagram illustrated to describe an example of a parameter modulation.

FIG. 7 illustrates an example of modulating a parameter depending on sensitivity (fourth modulation example). The fourth modulation example is an example in which a filter factor is generated on the basis of the sensitivity a determined by the sensitivity determination unit 108a and the generated filter factor is set as the filter factor of the high frequency component extraction unit 107a. Note that, in the case of the fourth modulation example, a filter factor generation unit 108b configured to generate a filter factor on the basis of the sensitivity a is added as a functional block of the control unit 108. The filter factor generation unit 108b maintains filter factors [c0, c1, c2, c3, c4] corresponding to the sensitivity a, in one example, as a table. Note that the sensitivity a in this example is a control value used to switch the high-pass filter in the high frequency component extraction unit 107a, and is a value that is set within the range of 0 to 1.0.

The sensitivity a is supplied from the sensitivity determination unit 108a to the filter factor generation unit 108b. The filter factor generation unit 108b determines a filter factor corresponding to the sensitivity a with reference to the table. The filter factor determined by the filter factor generation unit 108b is supplied to the high frequency component extraction unit 107a. The high frequency component extraction unit 107a sets the filter factors [c0, c1, c2, c3, c4] supplied from the filter factor generation unit 108b as the filter factors of the high-pass filter. It is possible to change the pass band of the high-pass filter by changing the filter factor. Specifically, when the sensitivity a is increased, a filter factor used to extend the pass band of the high-pass filter is set, and when the sensitivity a is decreased, a filter factor used to narrow the pass band of the high-pass filter is set. In one example, in the case where the sensitivity a is changed to 2.25 times, the pass band of the high-pass filter is changed from ¼ fs to ½ fs to ⅛ fs to ½ fs.

The increase in the sensitivity a extends the pass band of the high-pass filter, so increasing the sensitivity a is the processing of increasing the peaking response. The decrease in the sensitivity a narrows the pass band of the high-pass filter, so decreasing the sensitivity a is the processing of decreasing the peaking response.

Figure 8:
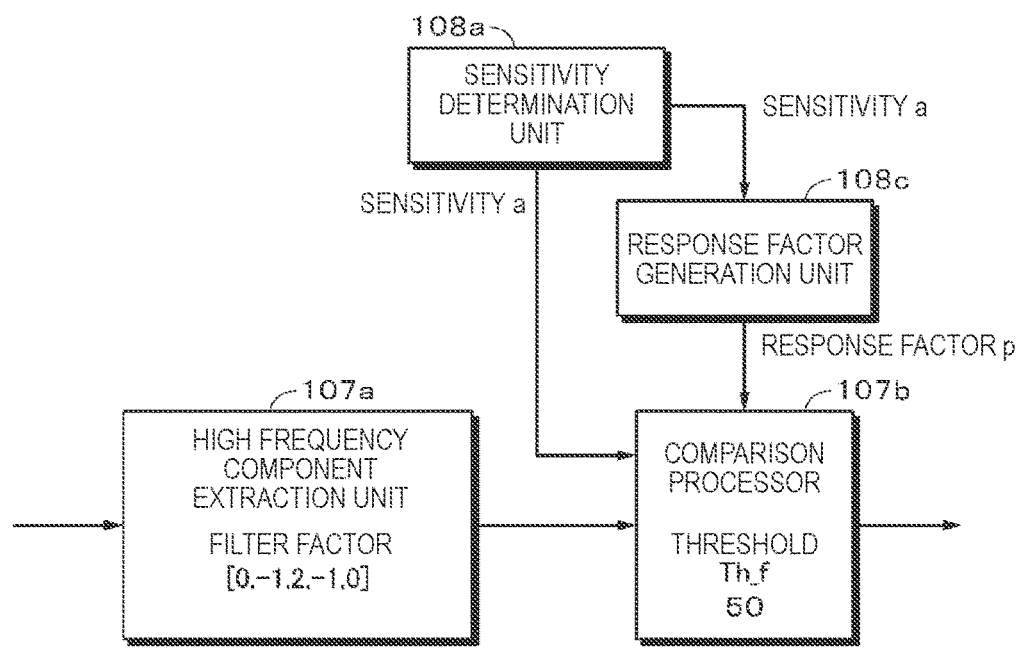
FIG. 8 is a diagram illustrated to describe an example of a parameter modulation.

FIG. 8 illustrates an example of modulating a parameter depending on sensitivity (fifth modulation example). The fifth modulation example is an example in which a response factor is generated on the basis of the sensitivity a determined by the sensitivity determination unit 108a or a change in the sensitivity a and the comparison processor 107b determines the threshold Th_f using the response factor. Note that in the case of the fifth modulation example, a response factor generation unit 108c configured to generate a response factor p on the basis of the sensitivity a is added as a functional block of the control unit 108. The response factor generation unit 108c maintains the response factor p corresponding to the sensitivity a, in one example, as a table.

The sensitivity a is supplied from the sensitivity determination unit 108a to the response factor generation unit 108c. The response factor generation unit 108c determines the response factor p corresponding to the sensitivity a with reference to the table. The response factor p determined by the response factor generation unit 108c is supplied to the comparison processor 107b. The comparison processor 107b uses the response factor p to smooth the threshold used to determine the specific pixel in the temporal direction and determines the threshold Th_f used to determine the specific pixel in the current frame. Note that smoothing in the temporal direction means that the threshold used to determine the specific pixel changes so that the threshold is tracked with a time lag with respect to a change in the in-focus degree, for example, a change in high frequency energy of an image.

The comparison processor 107b executes the smoothing processing on the basis of the following formula (1).

$$Th\_f=(1-p)\times Th\_p+p\times Th\_r \quad (1)$$

Each term in the above formula (1) is as follows:
Th_r: Threshold obtained from the current frame of an input image
Th_f: Threshold used for peaking processing of the current frame (threshold used to determine the specific pixel)
Th_p: threshold used for peaking processing of the previous frame
p: Response factor (weight of updating) (where, $0<p\le 1.0$)

Note that the threshold Th_f used for the peaking processing of the current frame can be determined in a similar way to that described in the first modulation example.

It is possible to adjust the degree (intensity) of smoothing in the smoothing processing by changing the response factor p. In one example, if the response factor p is decreased, smoothing is strongly performed. Specifically, the approach of the threshold Th_f used for the peaking processing of the current frame to the threshold Th_p used for the peaking processing of the previous frame allows the degree of updating to become weaker. Conversely, in one example, if the response factor p is increased, the effect of smoothing is weakened. Specifically, the threshold Th_p used for the peaking processing of the previous frame is difficult to be incorporated on the threshold Th_f used for the peaking processing of the current frame, so the degree of updating becomes strong. In other words, the response factor p can be a response factor defining the weight of updating.

In one example, when the sensitivity a is increasing, the response factor p is decreased to weaken the degree of updating of the threshold Th_f. The degree of updating of the threshold Th_f becomes weak, so the change in the peaking response becomes conspicuous. When the sensitivity a is decreasing, the response factor p is increased to strength the degree of updating of the threshold Th_f. The degree of updating of the threshold Th_f becomes stronger, so the adaptation speed (responsiveness) to the situation change such as a change in scenes can be increased.

The modulation examples described above may be combined with each other. In one example, both the parameters of the high frequency component extraction unit 107a and the comparison processor 107b may be modulated on the basis of the sensitivity a.

"Condition for Sensitivity Determination"

Next, a condition for determining the sensitivity a is described by exemplifying a plurality of conditions. The parameter is modulated as described above on the basis of the sensitivity a determined depending on conditions exemplified below. Note that the determination of the sensitivity a may mean either maintaining the sensitivity a determined once or changing the sensitivity a determined once depending on a change in conditions.

"First Condition"

The first condition is the in-focus degree. The in-focus degree herein is the extent that the in-focus (focusing) discriminated on the basis of the high frequency energy contained in an image is achieved. The higher the high frequency energy contained in an image, the higher the in-focus degree, and the lower the high frequency energy contained in the image, the lower the in-focus degree. The sensitivity a is determined depending on the in-focus degree, and further, the sensitivity a is changed depending on a change (increase or decrease) in the in-focus degree. The change in the sensitivity a includes a change in the sensitivity a to increase the sensitivity a by increasing the value of the sensitivity a, a change in the sensitivity a to decrease the sensitivity a by decreasing the value of the sensitivity a, and maintaining the sensitivity a with no change in the value of the sensitivity a.

Figure 9A:
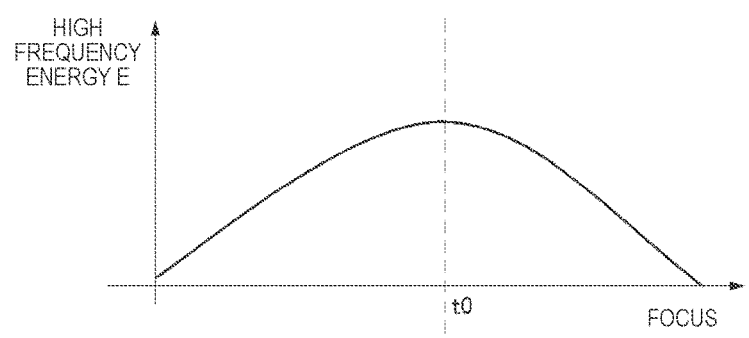
FIGS. 9A, 9B, and 9C are diagrams illustrated to describe an example of a method of determining sensitivity.

FIG. 9A is a diagram schematically illustrating a change in the high frequency energy E contained in an image. In one example, the position of the focal point (the position of the focus lens) changes by the manual focusing operation, and accordingly the high frequency energy E contained in an image changes.

It is assumed that the focus is gradually adjusted by the manual focusing operation, the in-focus is achieved at the timing of time t0, and then the focus is off. As the focus is adjusted as illustrated in FIG. 9A, the high frequency energy E contained in an image is increased and reaches the maximum value at time t0. Then, the high frequency energy E is decreased.

Figure 9B:
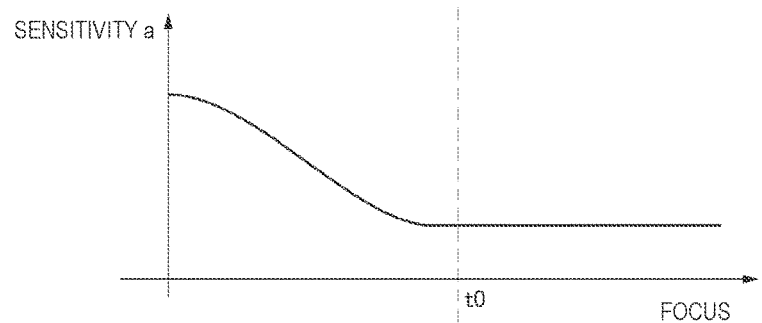
Figure 9C:
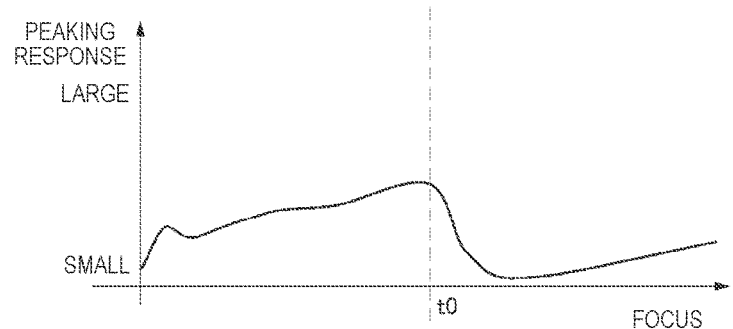

As schematically illustrated in FIG. 9B, during the focusing, in other words, in the case where the high frequency energy E is increased, the sensitivity a is continuously decreased. As a result, as illustrated schematically in FIG. 9C, it is possible to prevent a sudden increase in the peaking response and to avoid saturation from occurring. The sensitivity a is fixed (or may be gradually increased) after the timing of time t0, that is, in the case where the high frequency energy E is decreased from the maximum value (peak value) and the in-focus degree is maximized and then is decreased. The high frequency energy E contained in an image is decreased after the timing of the time t0, so the peaking response is decreased in the case where the sensitivity a is fixed as schematically illustrated in FIG. 9C. In this event, it changes abruptly with the decrease in the response, as compared with the increase in the peaking response. In other words, it is possible for the user to recognize the timing at which the focus is adjusted by the change in the peaking response. In particular, there is an effect that makes it easy to notice that the focus is being off, so there is an effect that it is easier to shoot by continuously tracking a subject in a moving image or the like.

Note that the sensitivity determination unit 108a maintains the change characteristics of the sensitivity a (characteristics illustrated in FIG. 9B) depending on the change in the high frequency energy E. The change in the high frequency energy E can be determined by the sensitivity determination unit 108a on the basis of the high frequency energy E supplied from the high frequency component extraction unit 107a, and the sensitivity determination unit 108a can appropriately determine the sensitivity a depending on the change in the high frequency energy E.

Whether or not the in-focus degree is the maximum may be determined by detection of a high frequency component, and it may be determined on the basis of a depth map (so-called depth map) generated by measuring the distance to a subject by the phase difference sensor 101c. Alternatively, other publicly known determination methods may be used.

In the example described above, the sensitivity a is maintained in the case where the in-focus degree is maximized and then decreased, but it does not necessarily need to be maximized, and the sensitivity a may be maintained or be increased at the point in time when the in-focus degree changes from increasing to decreasing.

Note that in the above example, the color of the peaking indication may be changed depending on whether the peaking response increases or decreases. In addition, when the peaking response increases or decreases, the peaking indication may blink. In the case where the peaking response increases or decreases, the peaking indication may be displayed to be thicker at a predetermined ratio so that the user may more easily recognize a change in the response. An auxiliary indication such as an arrow or a bar representing that the peaking response increases or decreases may be displayed.

"Second Condition"

The second condition is an example of determining the sensitivity a depending on image magnification. Here, the image magnification means a ratio of the size of an image formed on the image sensor 103 of the image capturing apparatus 100 to the actual size of a subject.

Figure 10A:
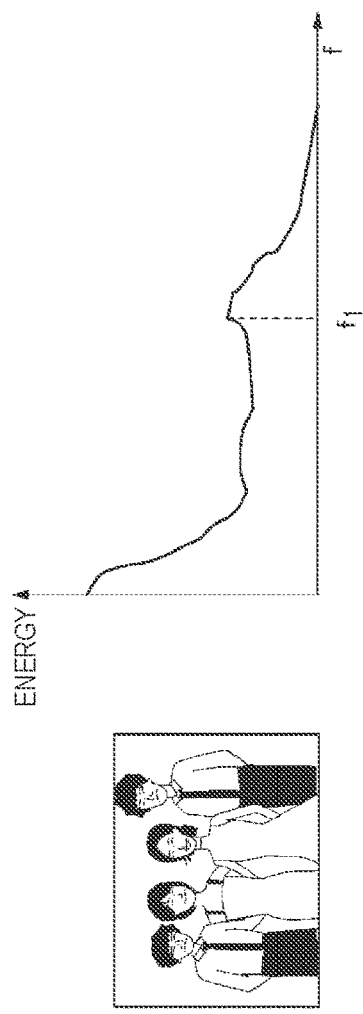
FIGS. 10A and 10B are diagrams illustrated to describe another example of the method of determining the sensitivity.
Figure 10B:
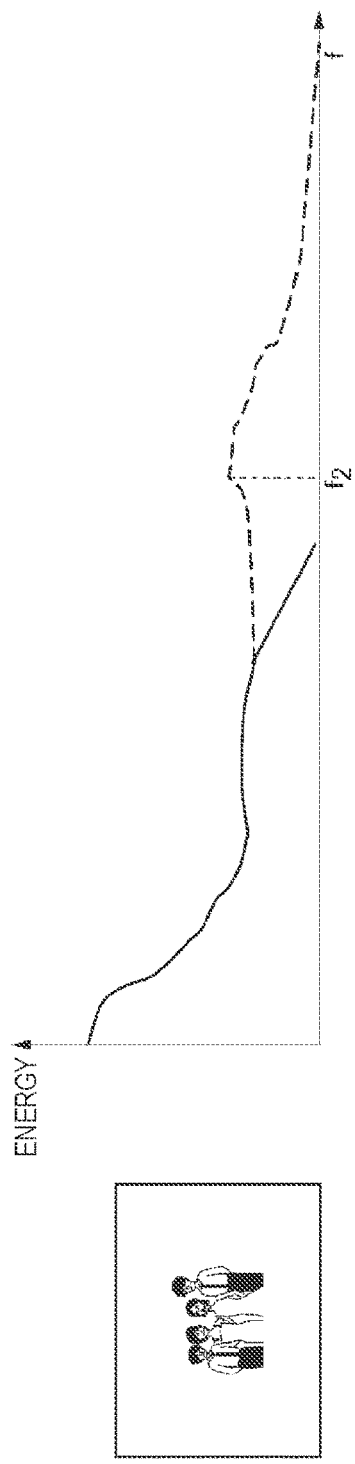

FIGS. 10A and 10B are diagrams schematically illustrating the frequency change of an input image accompanying the change in the image magnification. FIG. 10A is a diagram illustrating a captured image and frequency characteristics of the image. Here, a subject is assumed to be reduced by the zoom out operation. FIG. 10B is a diagram illustrating an image of the subject reduced by the zoom out operation and frequency characteristics of the image. As illustrated in FIG. 10B, the energy of the image is shifted to the high frequency side due to the size reduction. In one example, the component corresponding to the frequency f1 in the image of FIG. 10A is a component of the frequency f2 due to the reduction of the image magnification in the case of FIG. 10 B (note that the dotted line in FIG. 10B indicates the energy of the subject image shifted to the high frequency side, and the solid line indicates the energy in consideration of the capability (e.g., resolution) of the image capturing apparatus 100). The sensitivity a is appropriately determined depending on such change in frequency characteristics (change in image magnification) of the image.

As illustrated in FIGS. 10A and 10B, in the case where the image magnification is decreased, the reduced sensitivity a allows, in one example, the pass band of the high-pass filter in the high frequency component extraction unit 107*a* to be narrowed. Conversely, in the case where the image magnification is increased, the increased sensitivity a allows, in one example, the pass band of the high-pass filter in the high frequency component extraction unit 107*a* to be widened. Note that the image magnification and the sensitivity a are associated and maintained, in one example, as a table, and so it is possible for the sensitivity determination unit 108*a* to determine the sensitivity a depending on the image magnification. This makes it possible to keep the high frequency energy E substantially constant even when the image magnification is changed, thereby stabilizing the peaking response. In other words, it is possible to prevent the peaking response from being excessively increased or decreased.

The cutoff frequency of the high-pass filter may be changed depending on the sensitivity a determined depending on the image magnification. In one example, the cutoff frequency may be reduced in the case where the image magnification is increased and the sensitivity a is increased. Specifically, when the sensitivity a is doubled, the cutoff frequency may be set to a position of ½. Conversely, in the case where the image magnification is decreased and the sensitivity a is decreased, the cutoff frequency may be increased.

The parameter of the comparison processor 107*b* may be changed depending on the change in the frequency characteristics of an image. In one example, in the case where there is a change in the image magnification such that the high frequency energy E doubles, the sensitivity a may be decreased and the threshold Th_f may be doubled to stabilize the peaking response.

Note that the change in the image magnification may be determined by a change in the position of the zoom lens that is supplied from the lens driving driver 102, or may be determined by comparing images between frames, and other publicly known methods can be used.

"Other Conditions"

Figures 11, 12:
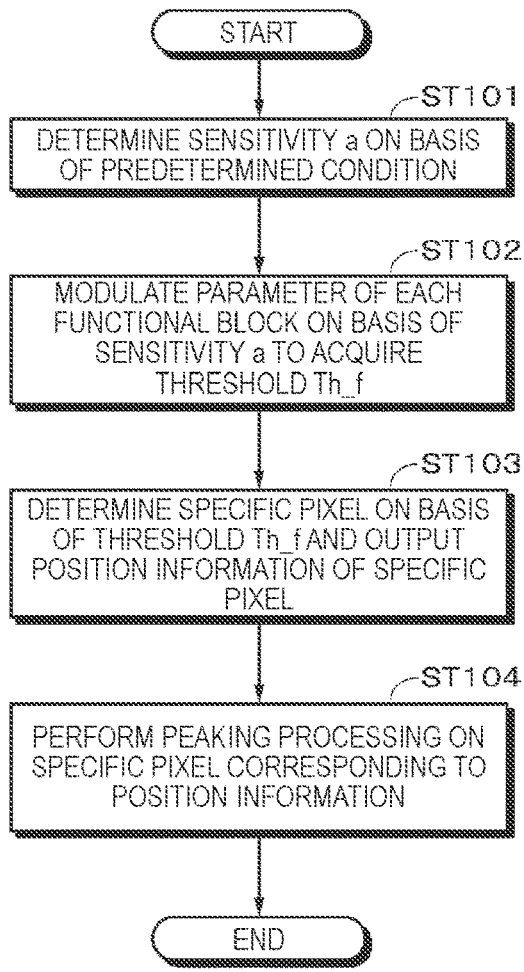
FIG. 11 is a diagram illustrated to describe a method of determining the sensitivity depending on shooting conditions.
FIG. 12 is a flowchart illustrated to describe an example of a processing procedure.

The sensitivity a may be determined depending on shooting conditions. The shooting condition is a parameter determined depending on the performance of the image capturing apparatus 100, an application executed by the control unit 108, or the like. An example of the shooting condition can include a mode (shooting mode) that can be set in the image capturing apparatus 100, a position or aperture of the lens 101*a*, a frame rate, a shutter speed, white balance, an angle of view, vibration of the image capturing apparatus 100 obtained by the camera shake sensor 110, or the like. The shooting condition may be set by the user, or may be automatically recognized by the image capturing apparatus 100. FIG. 11 is a diagram illustrating an example of a shooting condition and the sensitivity a corresponding to the shooting condition. In this example, vibration and shooting modes of the image capturing apparatus 100 are illustrated as a shooting condition.

In the case where the vibration of the image capturing apparatus 100 is large or the case where the shooting mode is sports mode, it is assumed that a moving image is being captured. In the case where the change in scenes is large, such as moving image shooting, the sensitivity a is decreased. On the other hand, in the case where the vibration of the image capturing apparatus 100 is small or the case where the shooting mode is the landscape mode or the nightscape mode, it is assumed that a still image is being captured. In the case where there is little change in scenes, such as still image shooting, the sensitivity a is increased. In this way, the sensitivity a may be determined depending on shooting conditions.

The sensitivity a may be determined on the basis of the characteristics of a subject (the predicted value of the spatial frequency characteristics at the time of in-focus). In one example, in the case where the contrast of the subject is low (low contrast), the gain or the like may be increased by increasing the sensitivity a.

The sensitivity a may be determined depending on an input operation (setting operation) performed on the input unit 109 by the user. The sensitivity a may be adjusted by increasing or decreasing the sensitivity a while viewing the peaking response displayed on the display unit 106, or the sensitivity a may be set in advance.

"Processing Procedure"

The processing procedure in the image capturing apparatus 100 is described with reference to the flowchart in FIG. 12. In step ST101, the sensitivity determination unit 108*a* determines the sensitivity a on the basis of a predetermined condition. Then, the processing proceeds to step ST102.

In step ST102, the parameter of the functional block (e.g., the high frequency component extraction unit 107*a*) in the control unit 108 is modulated on the basis of the sensitivity a determined in step ST101. Processing in each functional block is performed on the basis of the modulated parameter, and as a result of the processing, the threshold Th_f used to determine the specific pixel is acquired. Then, the processing proceeds to step ST103.

In step ST103, the comparison processor 107*b* compares the threshold Th_f acquired in step ST102 with the evaluation value of each pixel. Then, a pixel having an evaluation value larger than a threshold is determined as the specific pixel, and the position information of the pixel determined to be the specific pixel is output to the peaking rendering unit 107c. Then, the processing proceeds to step ST104.

In step ST104, the peaking rendering unit 107c executes the peaking processing of highlighting the pixel at a position corresponding to the position information. Then, the image whose specific pixel is highlighted is displayed on the display unit 106.

2. Modified Example

Additionally, the present technology may also be configured as below.

(1)

An image processing apparatus including:

a display control unit configured to display highlighting corresponding to an in-focus degree of a subject included in an image on the basis of predetermined sensitivity and to perform control so that the sensitivity is determined depending on a predetermined condition.

(2)

The image processing apparatus according to (1), in which the display control unit performs control so that the sensitivity is changed depending on a change in the in-focus degree.

(3)

The image processing apparatus according to (2), in which the display control unit performs control so that the sensitivity is decreased with increase in the in-focus degree and the sensitivity is maintained or increased with decrease in the in-focus degree.

(4)

The image processing apparatus according to (1), in which the display control unit performs control so that the sensitivity is determined depending on a change in image magnification of the image.

(5)

The image processing apparatus according to (1), in which the display control unit performs control so that the sensitivity is determined depending on a shooting condition.

(6)

The image processing apparatus according to (1), in which the display control unit performs control so that the sensitivity is determined depending on a setting operation by a user.

(7)

An image processing method including:

displaying highlighting corresponding to an in-focus degree of a subject included in an image on the basis of predetermined sensitivity and performing control so that the sensitivity is determined depending on a predetermined condition.

(8)

A display control apparatus including:

a display control unit configured to cause a display unit to display highlighting corresponding to an in-focus degree of a subject included in an image so that the highlighting is differently displayed between a case where the in-focus degree is increased and a case where the in-focus degree is decreased.

(9)

The display control apparatus according to (8), in which the in-focus degree is discriminated depending on an evaluation value based on a high frequency component contained in the image.

(10)

The display control apparatus according to (8), in which the in-focus degree is discriminated on the basis of a distance to the subject.

(11)

A display control method including:

causing a display unit to display highlighting corresponding to an in-focus degree of a subject included in an image so that the highlighting is differently displayed between a case where the in-focus degree is increased and a case where the in-focus degree is decreased.

Although the embodiments of the present technology have been described above specifically, the present technology is not limited to the embodiments described above, and various modifications based on the technical idea of the present technology are possible. In one example, the configurations, methods, processes, shapes, materials, numerical values, and the like mentioned in the above embodiments are merely examples, and if necessary, different configurations, methods, processes, shapes, materials, numerical values, and the like may be used.

Figure 13:
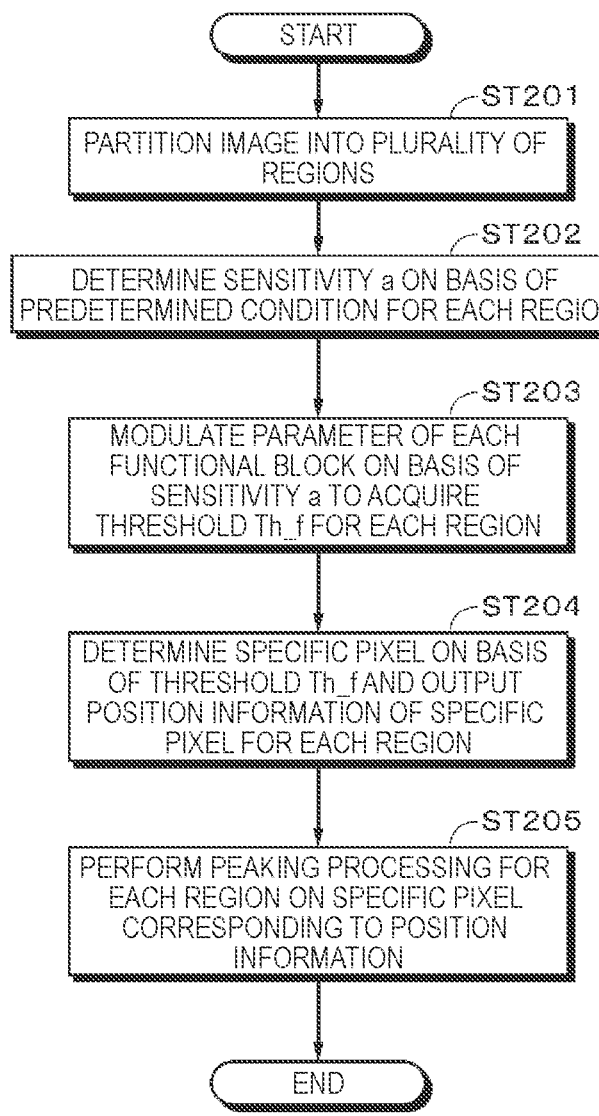
FIG. 13 is a flowchart illustrated to describe an example of a processing procedure in a modified example.

It is also possible to partition an image into a plurality of regions, determine the sensitivity a for each region, and modulate the parameter on the basis of the sensitivity a. In one example, as illustrated in the flowchart of FIG. 13, in step ST201, an image (one frame) is partitioned into a plurality of regions. The size of the region can be set as appropriate. Then, the processing described with reference to FIG. 12 is performed for each region. Briefly, in step ST202, the sensitivity a is determined for each region on the basis of a predetermined condition, and in step ST203, the threshold Th_f is acquired for each region. Then, in step ST204, position information of the specific pixel for each region is output on the basis of the threshold Th_f acquired for each region, and the peaking processing may be performed for each region in step ST205.

It may be possible to perform limit processing of providing a lower limit value for the threshold Th_f so that the threshold Th_f does not fall below the lower limit value. This limiting processing makes it possible to prevent unnecessary peaking from being displayed when any part of an image is out of focus. In addition, in the case where the value of the threshold Th_f is too low and the noise is determined to be the specific pixel, it is possible to prevent the peaking processing from being performed on the noise.

A plurality of thresholds may be set as the threshold Th_f. The peaking may be performed, every time the evaluation value of a pixel exceeds each threshold, by coloring the pixel and the like with different colors. In addition, in the case where the evaluation value of a pixel exceeds a first threshold, the pixel is colored, and in the case where the evaluation value exceeds a second threshold larger than the first threshold, the pixel and surrounding pixels are colored, so that the indication of the peaking becomes thicker in stages. The mode of change is not limited to a step-like form but may be continuous.

The limit processing may be performed in the case where the cutoff frequency of the high-pass filter of the high frequency component extraction unit 107a is adjusted. Specifically, processing may be performed so that the cutoff frequency does not exceed the Nyquist frequency of the image capturing apparatus 100 or does not increase to a frequency exceeding the capability of the lens of the image capturing apparatus 100.

The specific pixel to be subjected to the peaking processing is not necessarily determined by the high frequency component included in the pixel, but a pixel constituting the outline of the focused subject may be determined as the specific pixel.

In the above-described embodiments, the in-focus degree may be obtained by the phase difference detection method using the phase difference sensor 101c, and the peaking may be displayed in the case where the in-focus degree becomes a certain level or higher.

The present technology also can be implemented as an image processing apparatus including the control unit 108, and is not necessarily made to be an apparatus having a shooting function or a display function.

In the case where the sensitivity a is changed, the sensitivity a may be switched continuously or stepwise.

Further, the configurations, methods, processes, shapes, materials, numerical values, and the like of the above-described embodiments can be combined with each other as long as they do not deviate from the gist of the present technology. In addition, the present technology can be implemented not only by the apparatus and the system but also by a method or the like.

REFERENCE SIGNS LIST 100 image capturing apparatus
101c phase difference sensor
106 display unit
107 peaking processor
107a high frequency component extraction unit
107b comparison processor
108 control unit
108a sensitivity determination unit

The invention claimed is:

1. An image processing apparatus, comprising:
    circuitry configured to:
        display highlight corresponding to an in-focus degree of a subject included in an image, based on a sensitivity associated the highlight; and
        determine the sensitivity based on a condition;
            wherein the sensitivity is decreased with an increase in the in-focus degree and the sensitivity is one of maintained or increased with a decrease in the in-focus degree.
2. The image processing apparatus according to claim 1, wherein the circuitry is further configured to change the sensitivity based on a change in the in-focus degree.
3. The image processing apparatus according to claim 1, wherein the circuitry is further configured to determine the sensitivity based on a change in image magnification of the image.
4. The image processing apparatus according to claim 1, wherein the condition is a shooting condition.
5. The image processing apparatus according to claim 1, wherein the circuitry is further configured to determine the sensitivity based on a user setting.
6. An image processing method, comprising:
displaying highlighting corresponding to an in-focus degree of a subject included in an image, based on a sensitivity associated the highlighting; and
determining the sensitivity based on a condition,
    wherein the sensitivity is decreased with an increase in the in-focus degree and the sensitivity is one of maintained or increased with a decrease in the in-focus degree.
7. A display control apparatus, comprising:
circuitry configured to:
    control a display screen for display of highlight corresponding to an in-focus degree of a subject included in an image,
        wherein the highlight is differently displayed when the in-focus degree is increased and when the in-focus degree is decreased; and
    determine a sensitivity associated the highlight,
        wherein the sensitivity is decreased with the increase in the in-focus degree and the sensitivity is one of maintained or increased with the decrease in the in-focus degree.
8. The display control apparatus according to claim 7, wherein the in-focus degree is discriminated based on an evaluation value, and
wherein the evaluation value is based on a high frequency component contained in the image.
9. The display control apparatus according to claim 7, wherein the in-focus degree is discriminated based on a distance to the subject.
10. A display control method, comprising:
controlling a display screen to display highlighting corresponding to an in-focus degree of a subject included in an image,
    wherein the highlighting is differently displayed when the in-focus degree is increased and when the in-focus degree is decreased; and
determining a sensitivity associated the highlight,
    wherein the sensitivity is decreased with the increase in the in-focus degree and the sensitivity is one of maintained or increased with the decrease in the in-focus degree.

* * * * *